United States Patent
Diop et al.

(10) Patent No.: US 11,024,992 B2
(45) Date of Patent: *Jun. 1, 2021

(54) TAP CLAMP

(71) Applicant: Hubbell Incorporated, Shelton, CT (US)

(72) Inventors: Seydou Diop, Birmingham, AL (US); Adrian Beau Candelaria, Alabaster, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,717

(22) Filed: Jun. 8, 2020

(65) Prior Publication Data

US 2020/0303848 A1 Sep. 24, 2020

Related U.S. Application Data

(63) Continuation of application No. 16/323,141, filed as application No. PCT/US2017/045235 on Aug. 3, 2017, now Pat. No. 10,680,357.

(Continued)

(51) Int. Cl.
*H01R 13/00* (2006.01)
*H01R 11/15* (2006.01)
(Continued)

(52) U.S. Cl.
CPC ............... *H01R 11/15* (2013.01); *H01R 4/12* (2013.01); *H01R 4/363* (2013.01); *H01R 4/38* (2013.01);
(Continued)

(58) Field of Classification Search
CPC . H01R 4/12; H01R 4/363; H01R 4/38; H01R 4/42; H01R 4/40; H01R 9/03; H01R 11/15; H02G 7/00; H02G 1/02
(Continued)

(56) References Cited

U.S. PATENT DOCUMENTS 2,219,846 A 10/1940 Meyer
2,738,480 A 3/1956 Hubbard
(Continued)

OTHER PUBLICATIONS

PCT/US2017/045235 International Search Report and Written Opinion dated Aug. 3, 2017 (12 pages).

*Primary Examiner* — Abdullah A Riyami
*Assistant Examiner* — Vladimir Imas
(74) *Attorney, Agent, or Firm* — Michael Best & Friedrich, LLP

(57) ABSTRACT

A clamp provides electrical communication between a first conductor and a second conductor. The clamp includes a first housing portion having a first surface, a second surface, a first housing bore, and a cavity, the first housing bore extending along a longitudinal axis. The clamp further includes a clamp member at least partially disposed within the cavity of the first housing portion, the clamp member including a first clamp surface adjacent the second surface of the housing in a facing relationship. The clamp further includes a shaft oriented parallel to the longitudinal axis, the shaft coupling the first housing portion and the clamp member. The clamp further includes a second housing portion movably coupled to the first housing portion by the shaft, the second housing portion including a second housing bore and a second clamp surface, the second housing bore aligned with the longitudinal axis, the second clamp surface adjacent the first surface of the first housing portion in a facing relationship.

20 Claims, 7 Drawing Sheets

US 11,024,992 B2
Page 2

Related U.S. Application Data

(60) Provisional application No. 62/370,918, filed on Aug. 4, 2016.

(51) Int. Cl.
  *H01R 4/42* (2006.01)
  *H01R 9/03* (2006.01)
  *H02G 7/00* (2006.01)
  *H01R 4/12* (2006.01)
  *H01R 4/36* (2006.01)
  *H01R 4/38* (2006.01)
  *H01R 4/40* (2006.01)
  *H02G 1/02* (2006.01)

(52) U.S. Cl.
  CPC ............... *H01R 4/42* (2013.01); *H01R 9/03* (2013.01); *H02G 7/00* (2013.01); *H01R 4/40* (2013.01); *H02G 1/02* (2013.01)

(58) Field of Classification Search
  USPC .......................................................... 439/477
  See application file for complete search history.

(56) References Cited

U.S. PATENT DOCUMENTS

| | | | | |
|---|---|---|---|---|
| 2,867,787 | A | 1/1959 | Nilsson | |
| 3,425,028 | A | 1/1969 | Neaderland | |
| 3,487,160 | A | 12/1969 | Johnsen | |
| 3,845,235 | A | 10/1974 | Bahder | |
| 4,114,977 | A * | 9/1978 | Polidori | H01R 4/5091 403/390 |
| 4,292,732 | A | 10/1981 | Tucci | |
| 4,857,020 | A * | 8/1989 | Crosby | H01R 4/5091 439/783 |
| 4,911,572 | A * | 3/1990 | Williams | H01R 4/38 403/209 |
| 5,152,701 | A * | 10/1992 | Polidori | H01R 4/5091 403/396 |
| 5,278,353 | A | 1/1994 | Buchholz | |
| 5,320,565 | A * | 6/1994 | Polidori | H01R 11/11 439/791 |
| 5,369,849 | A | 12/1994 | DeFrance | |
| 5,547,404 | A | 8/1996 | Nellis, Jr. et al. | |
| 5,632,633 | A * | 5/1997 | Roosdorp | H01R 4/646 439/100 |
| 5,692,930 | A * | 12/1997 | Garver | H01R 4/44 439/781 |
| 5,752,860 | A | 5/1998 | Greaves | |
| 6,045,414 | A * | 4/2000 | DeFrance | H01R 4/42 439/790 |
| 6,390,861 | B1 | 5/2002 | DeFrance | |
| 6,986,673 | B2 * | 1/2006 | de la Borbolla | H01R 4/44 439/100 |
| 7,160,142 | B2 | 1/2007 | Hughes | |
| 7,182,653 | B1 | 2/2007 | Hoxha | |
| 7,703,722 | B2 * | 4/2010 | Bucciferro | F16B 7/0493 248/49 |
| 7,708,234 | B2 * | 5/2010 | Kossak | F16B 2/065 248/49 |
| 7,993,169 | B1 | 8/2011 | Hoxha | |
| 8,069,521 | B2 | 12/2011 | Beck et al. | |
| 8,512,070 | B2 | 8/2013 | De France | |
| 8,727,819 | B2 | 5/2014 | Giefers et al. | |
| 9,490,577 | B2 | 11/2016 | Diop | |
| 9,537,297 | B2 | 1/2017 | Cawood | |
| 9,812,794 | B2 | 11/2017 | De France | |
| 9,948,083 | B2 | 4/2018 | Cawood | |
| 10,128,582 | B2 * | 11/2018 | Diop | H01R 4/42 |
| 10,164,356 | B2 * | 12/2018 | Diop | H01R 4/42 |
| 2012/0217062 | A1 | 8/2012 | Cawood | |
| 2015/0107875 | A1 | 4/2015 | Diop et al. | |

* cited by examiner

TAP CLAMP

CROSS-REFERENCE TO RELATED APPLICATION

This application claims the benefit of prior-filed, co-pending U.S. patent application Ser. No. 16/323,141, filed on Feb. 4, 2019, which is a 371 of PCT/US2017/045235, filed on Aug. 3, 2017, which claims priority to Provisional Patent Application No. 62/370,918, filed Aug. 4, 2016, the entire contents of all are hereby incorporated by reference.

BACKGROUND

The present disclosure relates to connectors for electrical conductors, and particularly to conductor tap clamps.

SUMMARY

Conductor tap clamps are hot line connectors for providing electrical communication with or tapping a into main power line. In some applications, conductor tap clamps attach a first conductor to a second, energized, conductor engaged with a transformer.

In one aspect, a clamp for providing electrical communication between a first conductor and a second conductor includes a first housing portion having a first surface, a second surface, a first housing bore, and a cavity, the first housing bore extending along a longitudinal axis. The clamp further includes a clamp member at least partially disposed within the cavity of the first housing portion, the clamp member including a first clamp surface adjacent the second surface of the housing in a facing relationship. The clamp further includes a shaft oriented parallel to the longitudinal axis, the shaft coupling the first housing portion and the clamp member. The clamp further includes a second housing portion movably coupled to the first housing portion by the shaft, the second housing portion including a second housing bore and a second clamp surface, the second housing bore aligned with the longitudinal axis, the second clamp surface adjacent the first surface of the first housing portion in a facing relationship.

In another aspect, a method is provided for providing electrical communication between a first conductor and a second conductor. The method includes positioning the first conductor between a first surface of a first housing portion and a first clamp surface of a second housing portion; positioning the second conductor between a second surface of the first housing portion and a second clamp surface of a clamp member; actuating a shaft against a force of a biasing member to increase a distance between the first housing portion and the second housing portion to load the first conductor between the first surface of the first housing portion and the first clamp surface of the second housing portion; releasing the shaft to secure the first conductor between the first surface of the first housing portion and the first clamp surface of the second housing portion; actuating the shaft extending through the first housing portion, the second housing portion, and the clamp member to decrease a distance between the second surface of the first housing portion and the second clamp surface of the clamp member to secure the second conductor between the second surface of the first portion of the housing and the second clamp surface of the clamp member.

In yet another aspect, a clamp for providing electrical communication between a first conductor and a second conductor includes a first housing portion, a second housing portion, and a shaft. The first housing portion includes a first surface and a first housing bore extending along a longitudinal axis. The second housing portion includes a second surface and a second housing bore aligned with the longitudinal axis, the second clamp surface adjacent the first clamp surface in a facing relationship to cooperatively form a channel therebetween. The channel is configured to receive the first conductor. The shaft is oriented parallel to the longitudinal axis. The shaft couples the first housing portion and the second housing portion. The shaft is operable to change a spacing between the first surface and the second surface.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
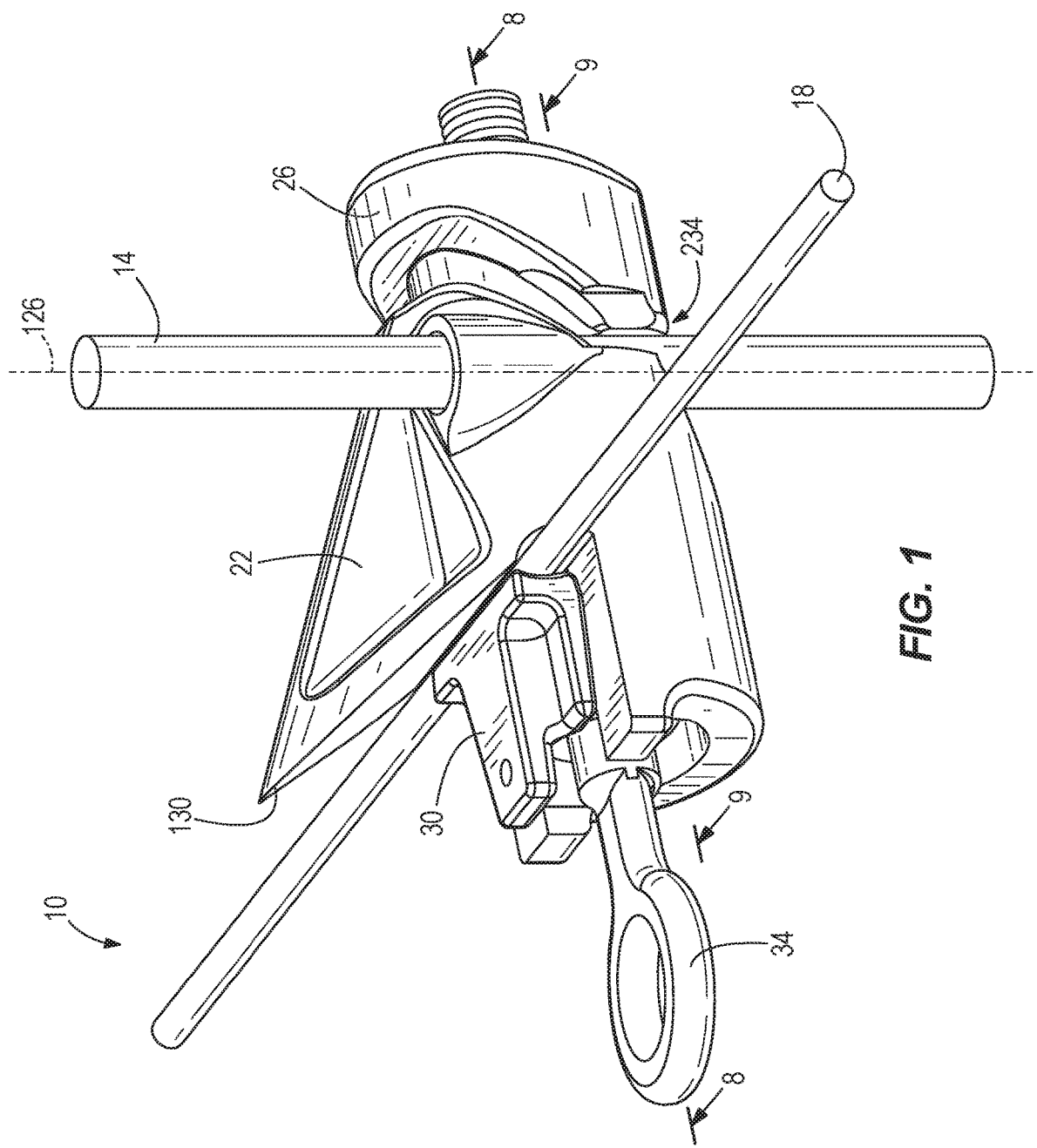
FIG. 1 is a perspective view of a clamp engaged with a first conductor and a second conductor.
Figure 2:
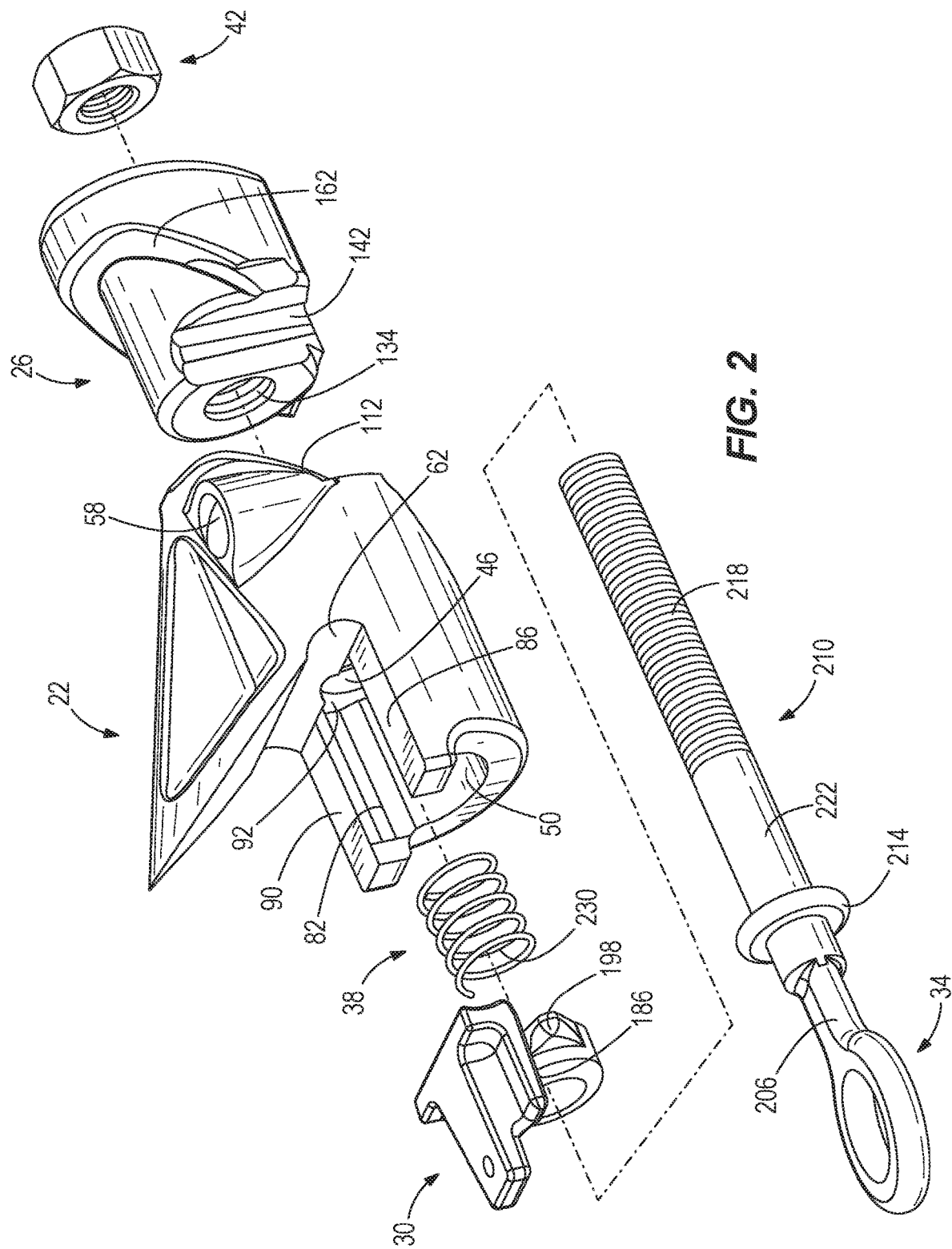
FIG. 2 is an exploded view of the clamp of FIG. 1.

FIG. 1 illustrates a clamp 10 for electrically connecting a first conductor 14 and a second conductor 18. In the illustrated embodiment, the clamp 10 is a tap clamp or a hot line clamp, and the clamp 10 includes a first housing portion or main housing 22, a second housing portion or gripper 26, a clamp member or keeper 30, a linear actuator 34, a resilient member 38 (FIG. 2), and a nut 42 (FIG. 2).

Figure 3:
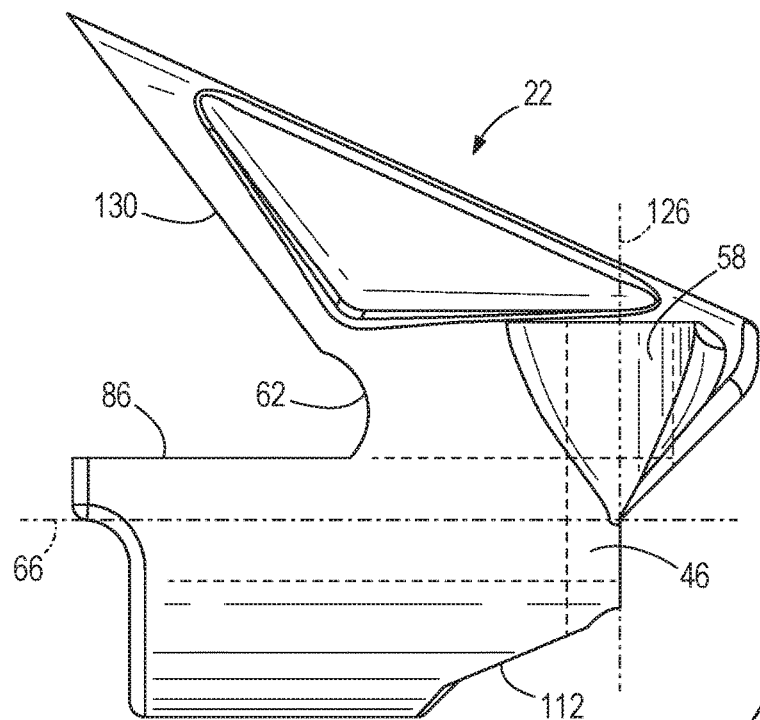
FIG. 3 is a side view of a main housing.

As shown in FIGS. 2-5 and 8, the main housing 22 includes a first bore or main housing bore 46, a first channel 50 (FIG. 4), a second channel 54 (FIG. 5), a first surface 58, and a second surface 62. In the illustrated embodiment, the main housing 22 is made from a conductive material; in other embodiments, only a portion of the main housing 22 is made from a conductive material. As shown in FIG. 3, the main housing bore 46 extends along a longitudinal axis 66.

Figure 4:
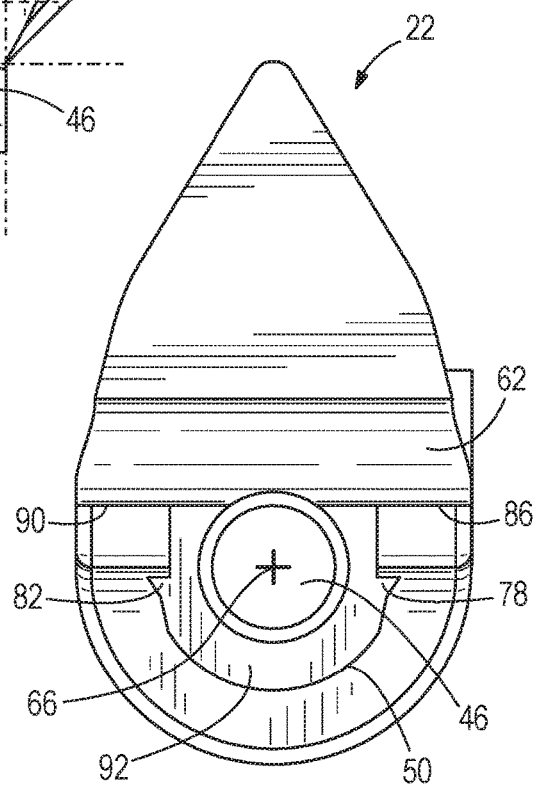
FIG. 4 is a first end view of the main housing of FIG. 3.
Figure 5:
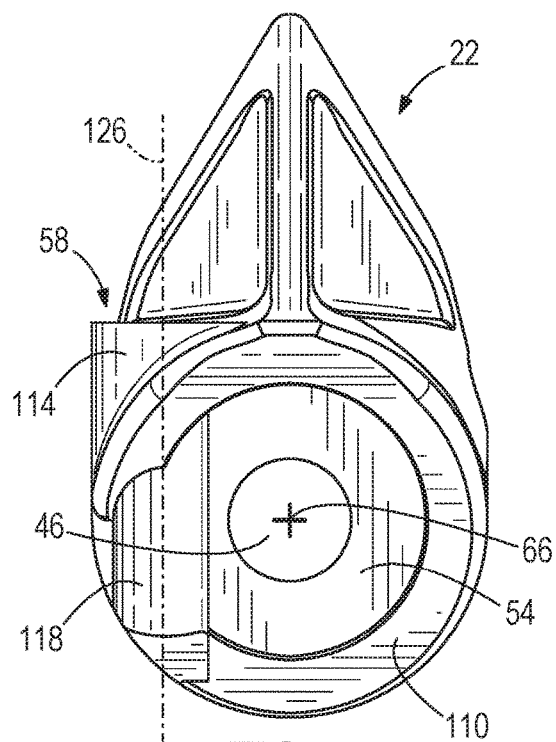
FIG. 5 is a second end view of the main housing of FIG. 3.

As shown in FIG. 4, the first channel 50 is adjacent the housing bore 46 and aligned along the longitudinal axis 66. In the illustrated embodiment, the first channel 50 is substantially U-shaped, although the first channel may have a different shape in other embodiments. The first channel 50 is positioned between a first upper surface 86, a second upper surface 90, and a wall 92. In the illustrated embodiment, a first track 78 and a second track 82 extend along the sides of the first channel 50, adjacent the upper surfaces 86, 90. The first track 78 and the second track 82 are spaced apart laterally from one another across the longitudinal axis 66 and extend along a length of the first channel 50, parallel to the longitudinal axis 66. The first track 78 is positioned opposite the first upper surface 86 and the second track 82 is positioned opposite the second upper surface 90. In other embodiments, the main housing 22 may include fewer or more tracks, and the tracks may be positioned in a different manner.

Figure 8:
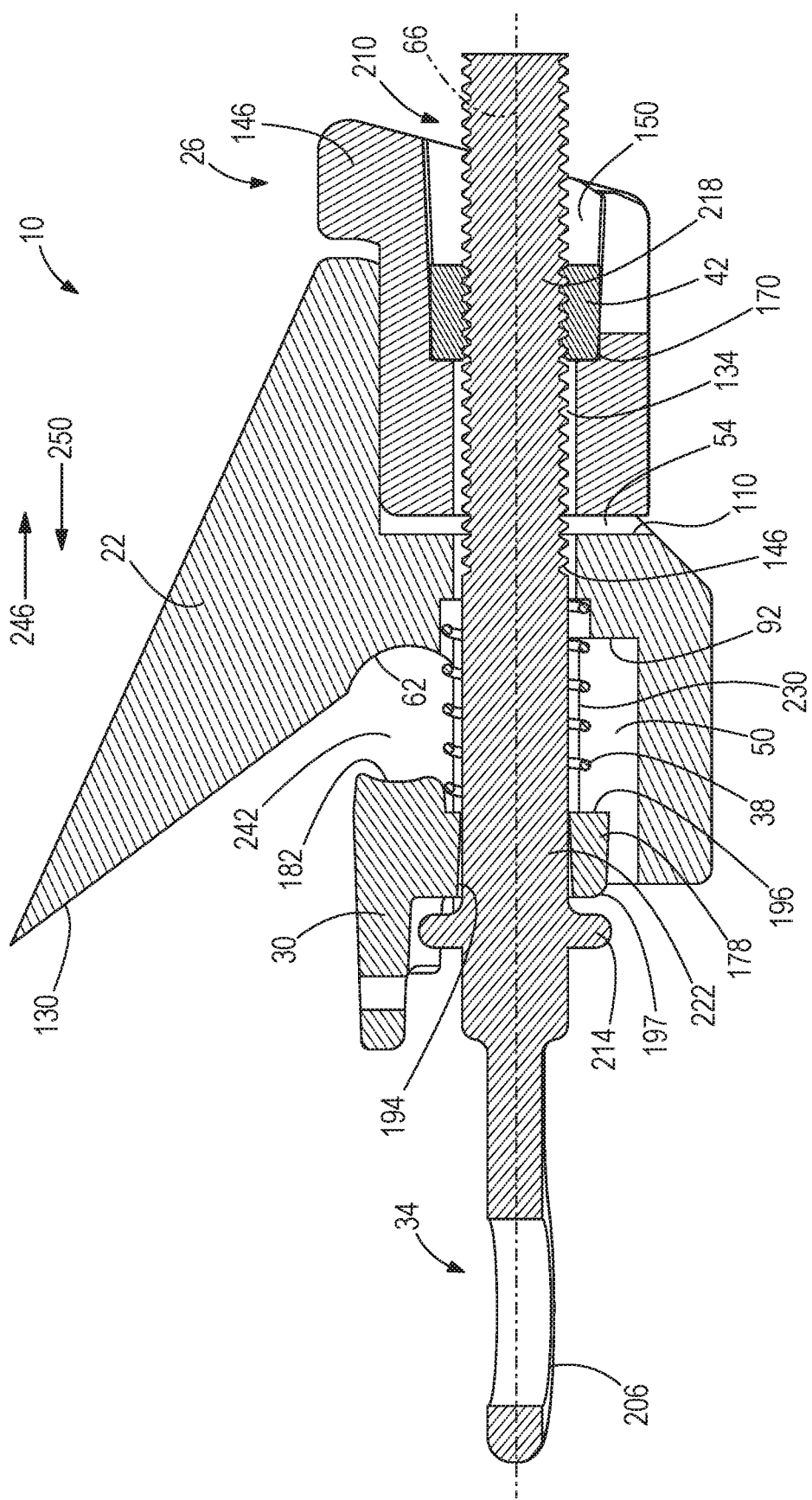
FIG. 8 is a section view of the clamp of FIG. 1 viewed along section 8-8, with the first conductor and second conductor removed.

As best shown in FIG. 8, the second channel 54 is spaced from the first channel 50 and extends in a direction generally parallel to the longitudinal axis 66. In the illustrated embodiment, the second channel 54 has a generally circular shape and extends between a rear wall 110 and an end surface 112 (FIG. 3) that is oriented at an angle relative to the longitudinal axis 66. As discussed in further detail below, the second channel 54 is sized to receive at least a portion of the gripper 26.

Referring again to FIG. 5, in the illustrated embodiment the first surface 58 includes an upper portion 114 and a lower portion 118 and is positioned adjacent the second channel 54. The upper portion 114 is formed as a bore extending along a first axis 126 that is substantially perpendicular to the longitudinal axis 66. The upper portion 114 and the lower portion 118 are aligned along the first axis 126. The upper portion 114 and the lower portion 118 are sized to receive the first conductor 14 (FIG. 1). In other embodiments, the first surface 58 may be formed in another shape, such as a partially curved or non-enclosed surface.

Figure 10:
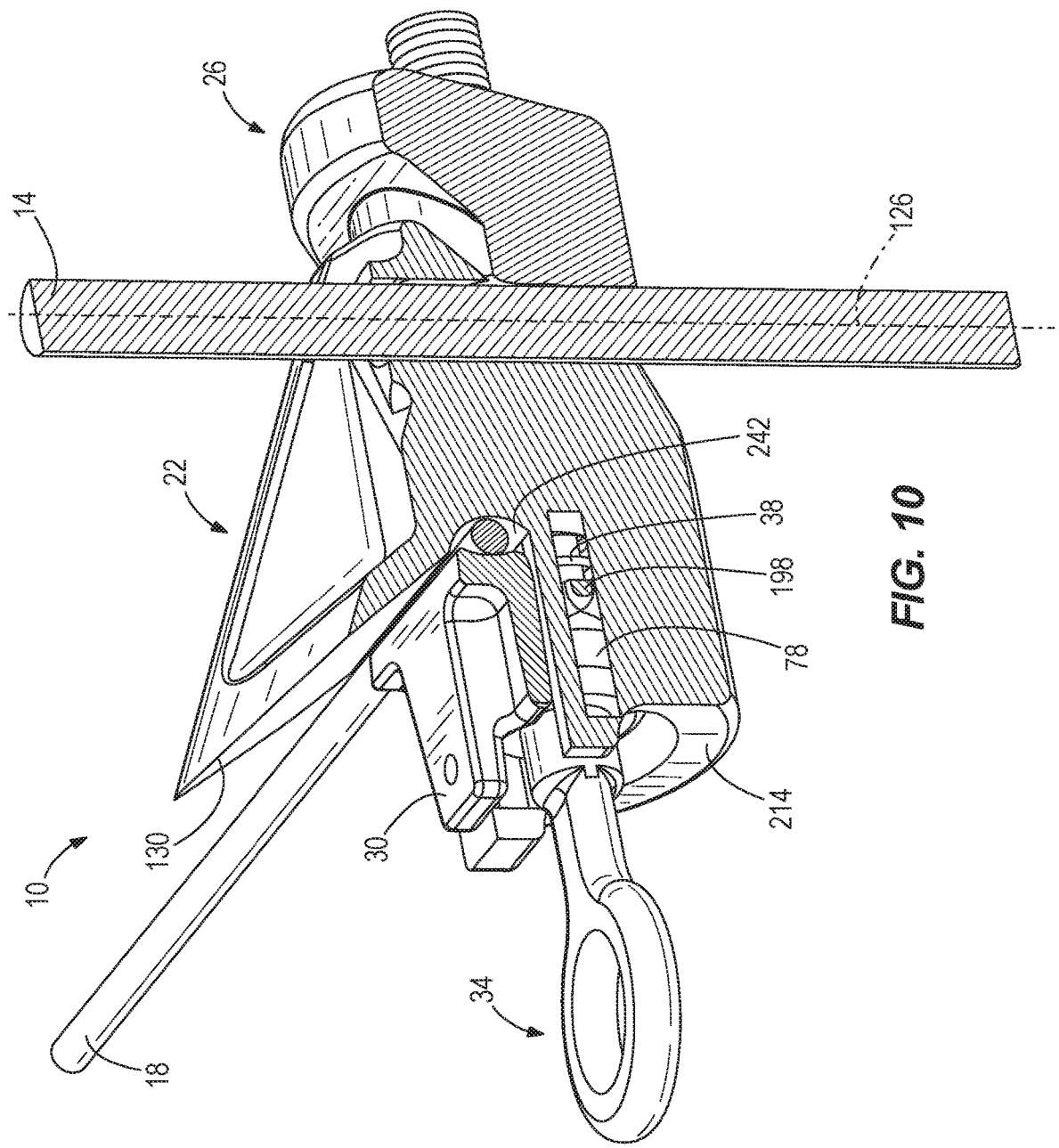
FIG. 10 is a section view of the clamp of FIG. 1 engaged with the first conductor and the second conductor and viewed along section 9-9.

As shown in FIG. 3, the second surface 62 is positioned between an inclined surface 130 of the main housing 22 and the upper surfaces 86, 90. The second surface 62 is a curved surface and is sized to receive a portion of the second conductor 18 (FIG. 1). In the illustrated embodiment, the second surface 62 extends along a direction that is substantially perpendicular to both the first surface 58 and the longitudinal axis 66, and partially defines a passage for the second conductor 18 (FIG. 10). In other constructions, the second surface 62, the first surface 58, and the longitudinal axis 66 may have a different geometric relationship. For example, the first surface 58, the second surface 62, and the longitudinal axis 66 may be formed at an angle relative to one another, but not mutually perpendicular.

Figure 6:
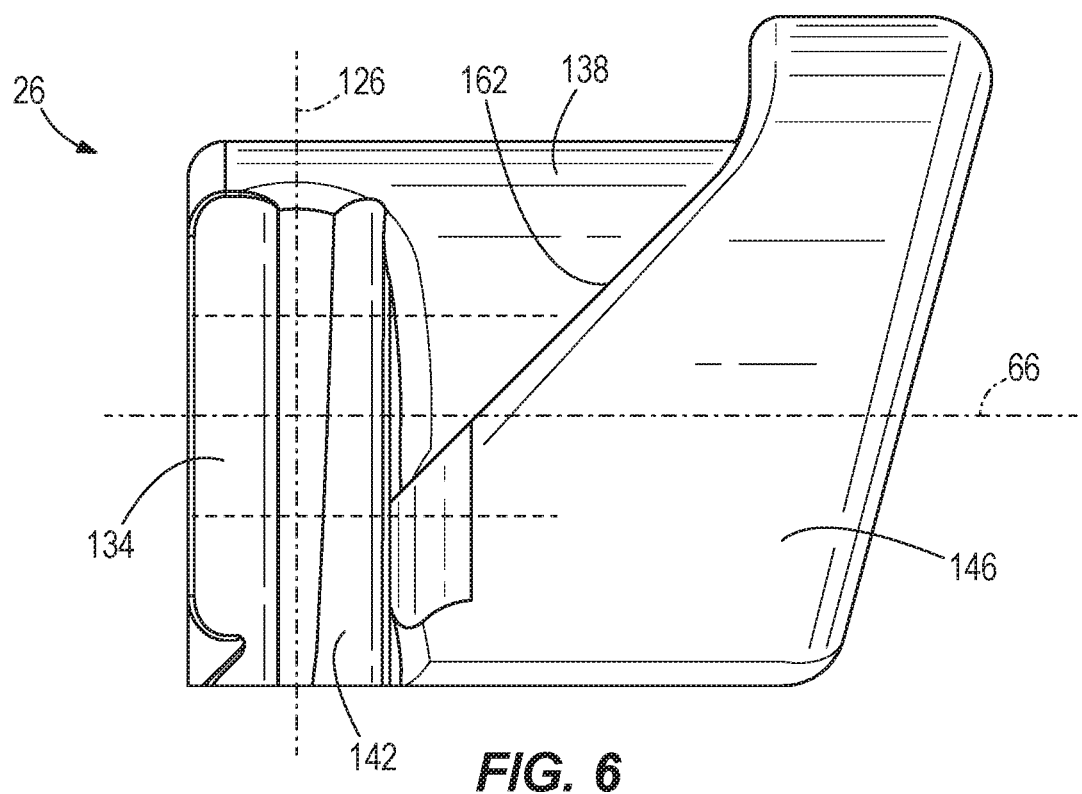
FIG. 6 is a side view of a gripper.

As shown in FIGS. 6 and 8, the gripper 26 includes an aperture 134, a first portion 138, a surface 142 (FIG. 6), a second portion 146, and a gripper channel or cavity 150 (FIG. 8). The aperture 134 is aligned along the longitudinal axis 66. In the illustrated embodiment, the surface 142 (FIG. 2) is curved and cooperates with the first surface 58 of the main housing 22 (FIG. 2) to form a passage for receiving the first conductor 14. The second portion 146 may have a profile that complements the profile of the housing end surface 112. For example, in the illustrated embodiment the second portion 146 includes peripheral surfaces 162 that are inclined to mate with the end surface 112 of the second channel 54.

As shown in FIG. 8, the cavity 150 is aligned with the aperture 134 along the longitudinal axis 66. The cavity 150 receives the nut 42. A rear wall 170 of the cavity 150 forms a seat abutting the nut 42 and provides a reaction surface. In the illustrated embodiment, the nut 42 has a non-circular cross section. The cavity 150 may have a non-circular cross section in a similar shape as the nut 42 so that the nut 42 does not rotate with respect to the gripper 26. The nut 42 is secured to (e.g. by in-casting, peening, or welding) or axially fixed with respect to the gripper 26. In other embodiments, the nut may have a circular or round cross-section.

Figure 7:
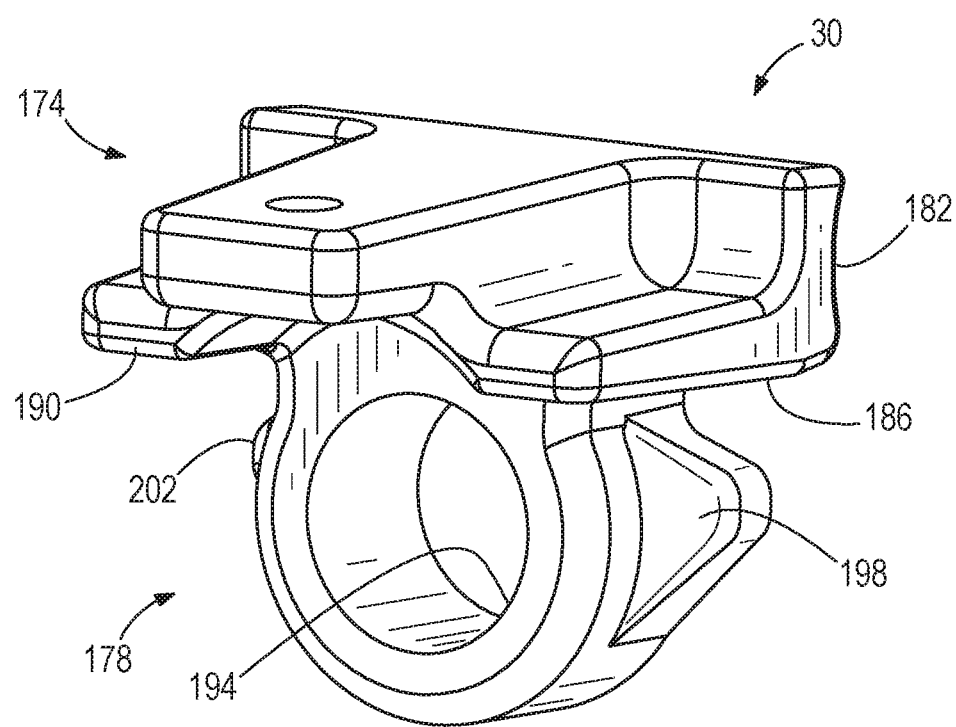
FIG. 7 is a perspective view of a keeper.

As shown in FIG. 7, the keeper 30 includes a first portion 174 and a second portion 178 coupled to the first portion 174. The first portion 174 of the keeper 30 includes a clamp surface or keeper surface 182, a first slide portion 186, and a second slide portion 190. The keeper surface 182 extends laterally relative to the axis 66 (FIG. 8). The keeper surface 182 is a curved surface and is sized to engage a portion of the second conductor 18 (FIG. 1). The first slide portion 186 and the second slide portion 190 are spaced apart laterally and oriented perpendicular to the keeper surface 182. In the illustrated embodiment, the first slide portion 186 and the second slide portion 190 have flat lower surfaces. As shown in FIG. 2, the first slide portion 186 and the second slide portion 190 engage the first upper surface 86 and the second upper surface 90 of the main housing 22, respectively.

Referring again to FIG. 7, in the illustrated embodiment, the second portion 178 includes an opening 194, a first guide 198 and a second guide 202. The opening 194 is aligned along the longitudinal axis 66 (FIG. 8). The first guide 198 and the second guide 202 are laterally spaced apart and protrude from opposite sides of the second portion 178. In the illustrated embodiment, the first guide 198 and the second guide 202 are substantially triangular. The first guide 198 is disposed within the first track 78 (FIG. 9) and the second guide 202 is disposed within the second track 82, respectively, of the main housing 22. In other embodiments, the guides 198, 202 may be formed in a different manner or may engage the main housing 22 in a different manner. In other embodiments, the keeper 30 may engage the main housing 22 in a different manner.

As shown in FIG. 2, the linear actuator 34 includes a shaft 210 and a flange 214. The shaft 210 may include a threaded portion 218 and a non-threaded portion 222. The flange 214 is positioned at one end of the shaft 210. In the illustrated embodiment, the actuator 34 is an eyebolt, and the flange 214 is positioned between the threaded portion 218 and an eye stem 206. In the illustrated embodiment, the flange 214 is circular and sized to be at least partially received by the first channel 50 of the main housing 22 (FIG. 10).

As shown in FIG. 2, the resilient member 38 in the present embodiment is a coiled compression spring. The coils of the compression spring define an opening 230 therebetween. The resilient member 38 is at least partially positioned within the first channel 50 of the main housing 22.

FIG. 8 shows a section view of the clamp 10. The opening 194 of the keeper 30, the opening 230 of the resilient member 38, the main housing bore 46, and the aperture 134 of the gripper 26 are aligned along the longitudinal axis 66, and the linear actuator 34 extends therethrough. The opening 194 of the keeper 30 and the resilient member 38 are disposed along the non-threaded portion 222 of the shaft 210. The resilient member 38 is seated against a first wall 196 of the keeper 30 and abuts the wall 92 of the first channel 50 of the main housing 22. The flange 214 abuts a second surface 197 of the second portion 178 of the keeper 30. The main housing bore 46 and the aperture 134 are disposed along the threaded portion 218 of the shaft 210. The threaded portion 218 is threadably engaged with the nut 42 disposed within the cavity 150 of the gripper 26. The nut 42 is seated against the rear wall 170 of the cavity 150 of the gripper 26, so that the linear actuator 34 and the gripper 26 move together along the axis 66.

Figure 9:
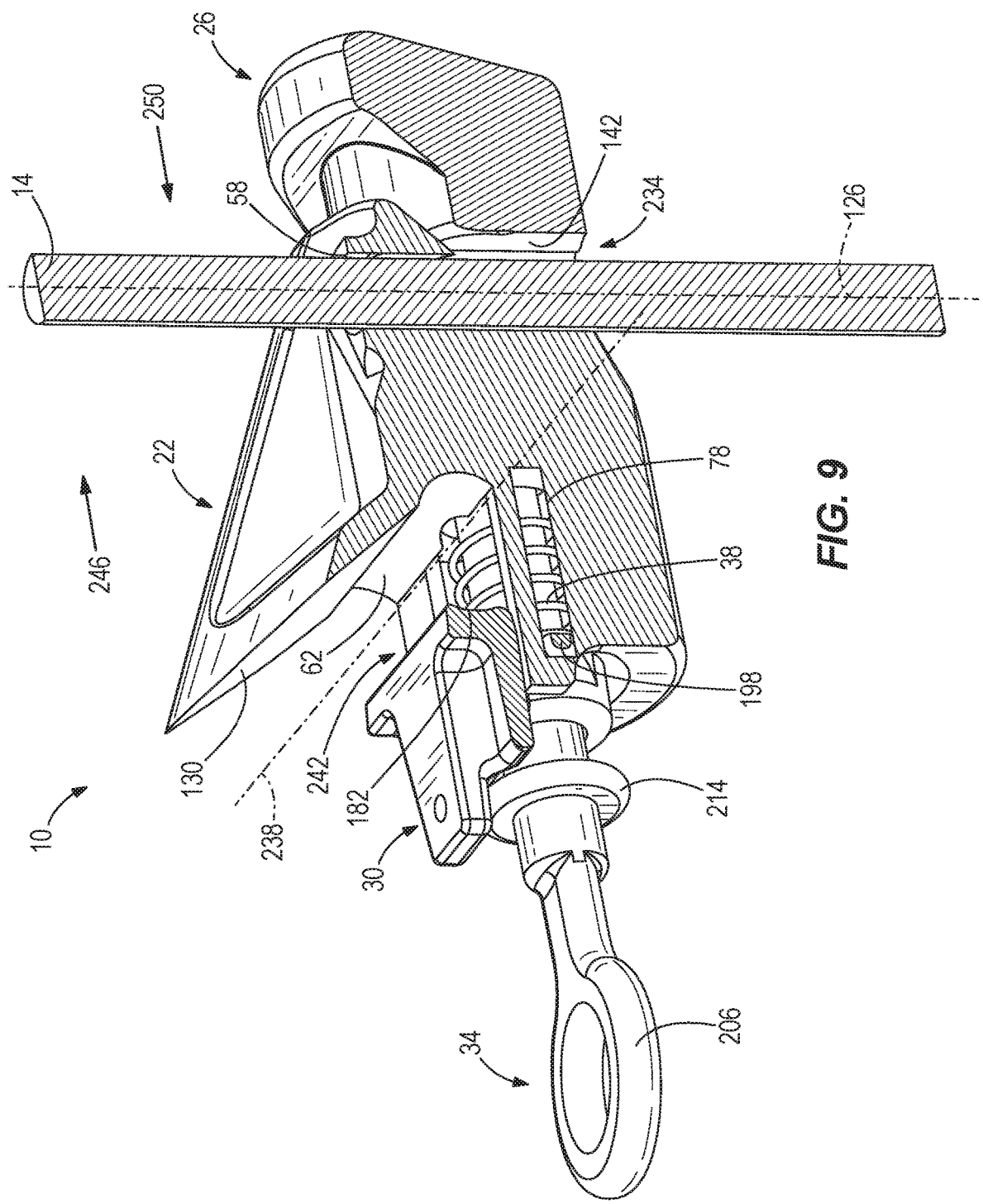
FIG. 9 is a section view of the clamp of FIG. 1 engaged with the first conductor and viewed along section 9-9.

As shown in FIG. 2, the first surface 58 of the main housing 22 and the surface 142 of the gripper 26 are aligned in a facing relationship to co-operatively define a first channel 234 (FIG. 9) therebetween extending along the first axis 126. Because the gripper 26 is movable relative to the main housing 22, the first channel 234 has a variable width to accommodate a variety of sizes of conductor. As shown in FIG. 9, the second surface 62 of the main housing 22 and the keeper surface 182 of the keeper 30 are aligned in a facing relationship to co-operatively define a second channel 242 therebetween extending along a second axis 238. Because the keeper 30 is movable relative to the main housing 22, the second channel 242 has a variable width to accommodate a variety of sizes of conductor.

Referring to FIG. 8, before installing the first conductor 14, an operator may immobilize the main housing 22 and push the linear actuator 34 against the bias of the resilient member 38 in a first direction 246 along the longitudinal axis 66. The flange 214 engages the second portion 178 of the keeper 30 and pushes the keeper 30 towards the main housing 22. As the keeper 30 slides towards the main housing 22, the first guide 198 (FIG. 7) and the second guide 202 of the keeper 30 travel along the first track 78 and the second track 82, respectively, of the main housing 22. As the linear actuator 34 is pushed in the first direction 246, the gripper 26 moves away from the main housing 22, creating a space between the main housing 22 and the gripper 26.

As shown in FIG. 9, the operator aligns the first surface 58 of the main housing 22 with the surface 142 of the gripper 26 along the first axis 126 to form the first channel 234 therebetween. The operator then inserts the first conductor 14 into the first channel 234. The operator releases the linear actuator 34, and the resilient member 38 urges the keeper 30 away from the main housing 22 in a second direction 250 along the longitudinal axis 66. As the resilient member 38 urges the keeper 30 away from the main housing 22, the gripper 26 is pulled towards the main housing 22 to hold the first conductor 14 within the first channel 234.

To insert the second conductor 18, the operator aligns the second conductor 18 along the inclined surface 130 of the main housing 22 and slides the second conductor 18 into the second channel 242 defined between the keeper surface 182 and the second surface 62. The operator threads the linear actuator 34 relative to the nut 42 (FIG. 8), pulling the keeper 30 and the gripper 26 towards the main housing 22 and decreasing a distance between the keeper surface 182 and the second surface 62 of the main housing 22. As the keeper 30 slides towards the main housing 22, the first guide 198 and the second guide 202 of the keeper 30 travel along the first track 78 and the second track 82, respectively, of the main housing 22 (FIGS. 9 and 10). The positioning of the guides 198, 202 of the keeper 30 within the tracks 78, 82 of the main housing 22 prevents the keeper 30 from rotating with respect to the main housing 22 as the linear actuator 34 is rotated, and maintains the keeper surface 182 in a parallel orientation with respect to the second surface 62 of the main housing 22. The rotation of the linear actuator 34 compresses the resilient member 38, thereby also decreasing a distance between the main housing 22 and the gripper 26 until the first conductor 14 and the second conductor 18 are held tightly by the clamp 10 as shown in FIG. 10.

In the embodiment shown in FIG. 10, the second conductor 18 is a live conductor. An electric current travels from the second conductor 18 through the main housing 22 and into the first conductor 14.

Although some aspects have been described in detail with reference to certain preferred embodiments, variations and modifications exist within the scope and spirit of one or more independent aspects as described. Various features and advantages are set forth in the following claims.

What is claimed is:

1. A clamp for providing electrical communication between a first conductor and a second conductor, the clamp comprising:
a first housing portion including a first surface and a second surface;
a clamp member including a first clamp surface adjacent the second surface of the first housing portion;
a shaft coupling the first housing portion and the clamp member; and
a second housing portion movably coupled to the first housing portion by the shaft, the second housing portion including a second clamp surface adjacent the first surface,
wherein the shaft is movable in a first direction to secure the first conductor between the first surface of the first housing portion and the second clamp surface, and
wherein the shaft is movable in a second direction to move the clamp member relative to the first housing portion to secure the second conductor between the second surface of the first housing portion and the first clamp surface.

2. The clamp of claim 1, wherein the first surface of the first housing portion and the second clamp surface of the second housing portion cooperatively form a channel therebetween, the channel configured to receive the first conductor.

3. The clamp of claim 2, wherein the first surface of the first housing portion is an internal surface of a cylindrical through-opening and the second clamp surface of the second housing portion is curved.

4. The clamp of claim 2, wherein the channel is oriented substantially perpendicular to the shaft.

5. The clamp of claim 1, wherein actuation of the shaft changes a spacing between the first surface of the first housing portion and the second clamp surface of the second housing portion.

6. The clamp of claim 1, wherein the first clamp surface is positioned on a first portion of the clamp member, the clamp member including a second portion having an internal hole receiving the shaft.

7. The clamp of claim 1, wherein the second surface of the first housing portion and the first clamp surface of the clamp member cooperatively form at least a portion of a channel therebetween, the channel configured to receive the second conductor.

8. The clamp of claim 7, wherein the second surface of the first housing portion and the first clamp surface of the clamp member form curved surfaces of the channel.

9. The clamp of claim 1, further comprising a resilient member exerting a biasing force on the shaft and biasing the second housing portion toward the first housing portion.

10. The clamp of claim 1, further comprising a threaded member threadedly engaging the shaft, and wherein the clamp member, the first housing portion, and the second housing portion are secured between the threaded member and a flange of the shaft.

11. A clamp for providing electrical communication between a first conductor and a second conductor, the clamp comprising:
   a first housing portion including a first surface, a second surface, and a first housing bore;
   a clamp member movably coupled to the first housing portion, the clamp member including a first clamp surface adjacent the second surface of the first housing portion; and
   a second housing portion movably coupled to the first housing portion, the second housing portion including a second housing bore and a second clamp surface, the second housing bore aligned with the first housing bore, the second clamp surface adjacent the first surface of the first housing portion, the second housing portion movable in one direction to secure the first conductor and clamp member is movable in a second direction to secure the second conductor.

12. The clamp of claim 11, further comprising a shaft that is oriented parallel to the first housing bore, the shaft coupling the first housing portion and the clamp member, and the second housing portion and the first housing portion.

13. The clamp of claim 12, further comprising a resilient member exerting a biasing force on the shaft and biasing the second housing portion toward the first housing portion.

14. The clamp of claim 12, wherein the first clamp surface is positioned on a first portion of the clamp member, the clamp member including a second portion having an internal hole receiving the shaft.

15. The clamp of claim 11, wherein the second surface of the first housing portion and the first clamp surface of the clamp member cooperatively form at least a portion of a channel therebetween, the channel configured to receive the second conductor.

16. The clamp of claim 11, wherein the first surface of the first housing portion and the second clamp surface of the second housing portion cooperatively form a channel therebetween, the channel configured to receive the first conductor.

17. A clamp for providing electrical communication between a first conductor and a second conductor, the clamp comprising:
   a first housing portion including a first surface and a first housing bore;
   a second housing portion including a second surface and a second housing bore aligned with the first housing bore, the first surface and the second surface configured to engage the first conductor disposed between the first housing portion and the second housing portion;
   a clamp member positioned proximate the first housing portion and configured to secure the second conductor against the first housing portion; and
   a shaft coupling the first housing portion and the second housing portion, the shaft being slideable to adjust a spacing between the first surface and the second surface and the shaft being threadable to adjust a spacing between the clamp member and the first housing portion.

18. The clamp of claim 17, wherein the shaft oriented orthogonal with respect to an axis of the first conductor and orthogonal with respect to an axis of the second conductor.

19. The clamp of claim 17, wherein the first surface of the first housing portion is an internal surface of a cylindrical through-opening and the second surface of the second housing portion is curved.

20. The clamp of claim 17, further comprising a resilient member exerting a biasing force on the shaft and biasing the second housing portion toward the first housing portion.

* * * * *